UNITED STATES PATENT OFFICE.

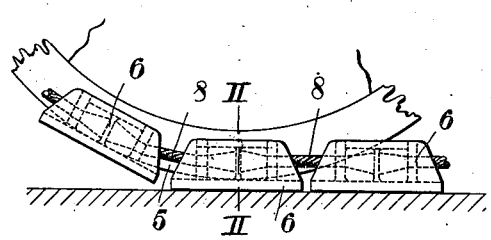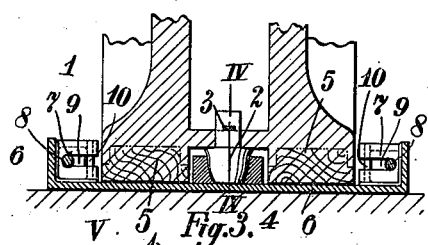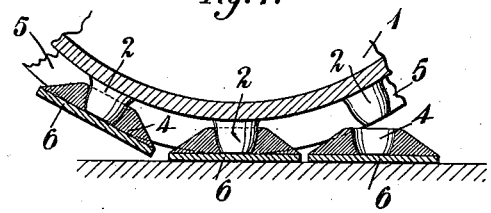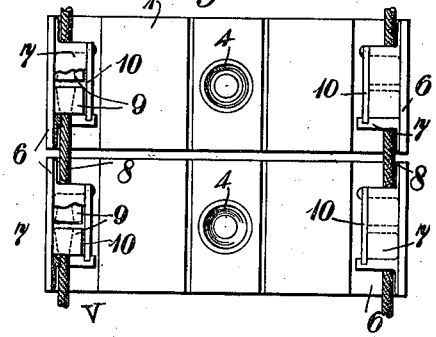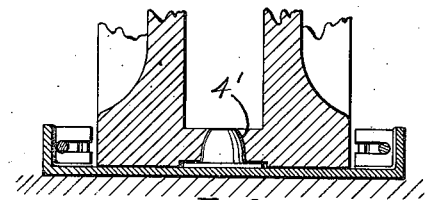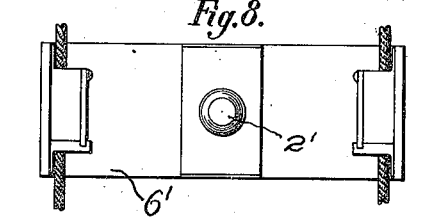

VALENTIN DUTKIEWICZ, OF PARIS, AND CONSTANT ISAMBERT, OF ABLIS, FRANCE.

ENDLESS TRACK.

1,420,531.   Specification of Letters Patent.   Patented June 20, 1922.

Application filed June 2, 1919, Serial No. 301,271. Renewed May 4, 1922. Serial No. 558,401.

*To all whom it may concern:*

Be it known that we, VALENTIN DUTKIEWICZ, a citizen of the French Republic, residing at Boulevard Pereire, Paris, France, and CONSTANT ISAMBERT, a citizen of the French Republic, residing at Ablis, Seine-et-Oise, France, have invented certain new and useful Improvements in Endless Tracks, of which the following is a specification.

This invention has for its object to provide an improved endless track for the wheels of a vehicle.

The improved endless track instead of being formed of links pivotally connected to one another as in the known constructions, consists of track members connected together by means of ropes.

These track members are connected together by means of sections of ropes which are adapted to connect only two adjacent track members together.

One of the characteristic features of this invention consists in the manner of attaching the ropes. Another characteristic feature consists in the manner of driving the endless track by the driving wheel without the intermediation of any axle or roller.

The accompanying drawings illustrate by way of example a constructional form of this invention.

Fig. 1 is a side elevation of a portion of the improved endless track, together with a portion of the wheel engaging therewith.

Fig. 2 is a cross section on the line II—II of Fig. 1.

Fig. 3 is a plan showing two track members connected together, some parts being drawn in section to show the manner of attaching the track members to the rope.

Fig. 4 is a longitudinal section on the line IV—IV of Fig. 2.

Fig. 5 is a longitudinal section of the endless track on the line V—V of Fig. 3, a portion being broken away to show the means for attaching the rope.

Fig. 6 is a fragmental cross sectional detail of a slightly modified form of the invention showing the pins carried by the plates.

Fig. 7 is a fragmental longitudinal sectional detail thereof, and

Fig. 8 is a fragmental top plan detail of the same.

In the example shown, in which the rope is made up of a plurality of separate sections, 1 is the driving wheel to which are fixed the pins 2 by means of a key 3. Each pin 2 engages in a recessed member 4.

The wheel 1 is provided on its rolling surface with felloes 5 of wood or any other material capable of moderating shock. These felloes rest on a track plate 6 of hard material which is the main part of the track member; it may be provided with studs.

On each track plate 6 are attached or cast lugs 7 for the connection of the ends of the rope sections 8. Each lug 7 is adapted to receive the ends of the rope sections provided with holders 9 in which the rope sections are held firmly by suitable known means.

10 are cover plates for the lugs 7; they serve to keep the holders 9 in place in the lugs 7. By this means the rope sections can be inserted and removed very quickly.

In Figs. 6, 7 and 8 the pins 2' are carried by the track plates 6' and are receivable in recesses 4' in the driving wheel.

What we claim is:—

In an endless track for the wheel of a vehicle the combination of a series of track plates, a plurality of rope sections for respectively connecting together each two adjacent plates, lugs attached to said track plates, holders attached to the ends of the rope sections and cover plates to secure said holders in place with respect to said lugs.

In testimony whereof we have signed our names to this specification.

VALENTIN DUTKIEWICZ.
CONSTANT ISAMBERT.